Figure 2:
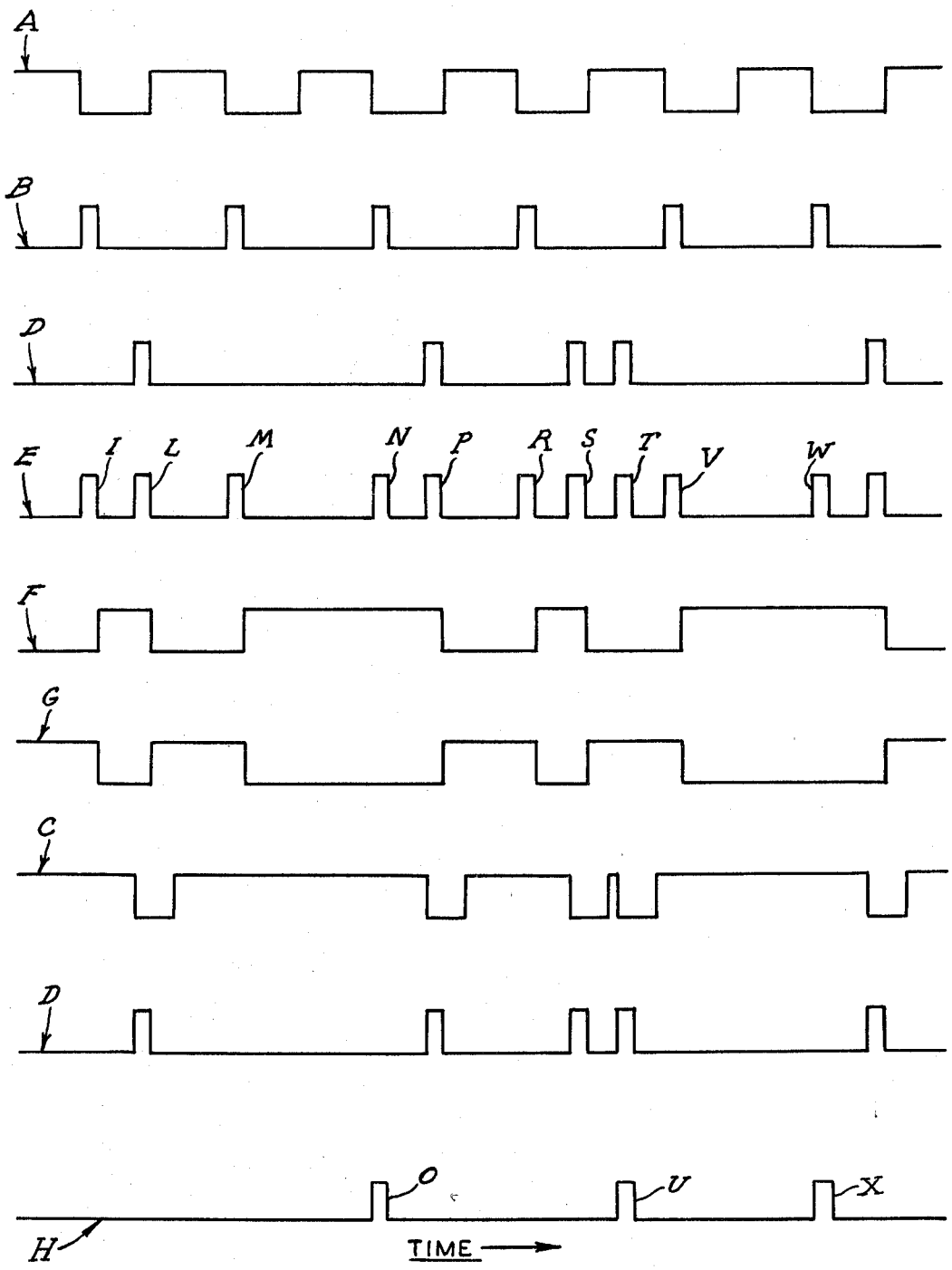

United States Patent [19]
Mayer

[11] 3,970,942
[45] July 20, 1976

[54] ANTI-HUNTING SYSTEM FOR VALVE OPERATOR CIRCUIT

[75] Inventor: Robert Mayer, Ardmore, Pa.

[73] Assignee: Sun Oil Company of Pennsylvania, Philadelphia, Pa.

[22] Filed: Jan. 2, 1975

[21] Appl. No.: 537,994

Related U.S. Application Data

[62] Division of Ser. No. 462,837, April 22, 1974, abandoned.

[52] U.S. Cl. .............................. 328/133; 307/232; 307/247 R; 318/696; 318/184
[51] Int. Cl.² ........................................ H03D 13/00
[58] Field of Search ............ 328/133, 134; 307/232, 307/233, 247 R; 318/184, 696

[56] References Cited
UNITED STATES PATENTS 3,069,623   12/1962   Murgio ........................... 328/134 X
3,629,711   12/1971   Strole et al. ..................... 328/133 X
3,688,202    8/1972   Naubereit et al. ................ 328/133 X
3,735,324    5/1973   Phillips ............................ 328/133
3,755,747    8/1973   Letosky ............................ 307/232
3,769,595   10/1973   Ooya et al. ....................... 328/133

Primary Examiner—John S. Heyman
Attorney, Agent, or Firm—J. Edward Hess; Donald R. Johnson; Gary V. Pack

[57] ABSTRACT

An anti-hunting system for use with a valve operator circuit which compares two trains of pulses to place a valve in the correct position. The anti-hunting system includes a J-K flip-flop circuit receiving a clock pulse train having an absolute time relationship with the input pulse trains. Also included in the valve operator circuit is a system having a shift register for controlling the energizing of the leads to a stepping motor controlling the valve position.

6 Claims, 4 Drawing Figures

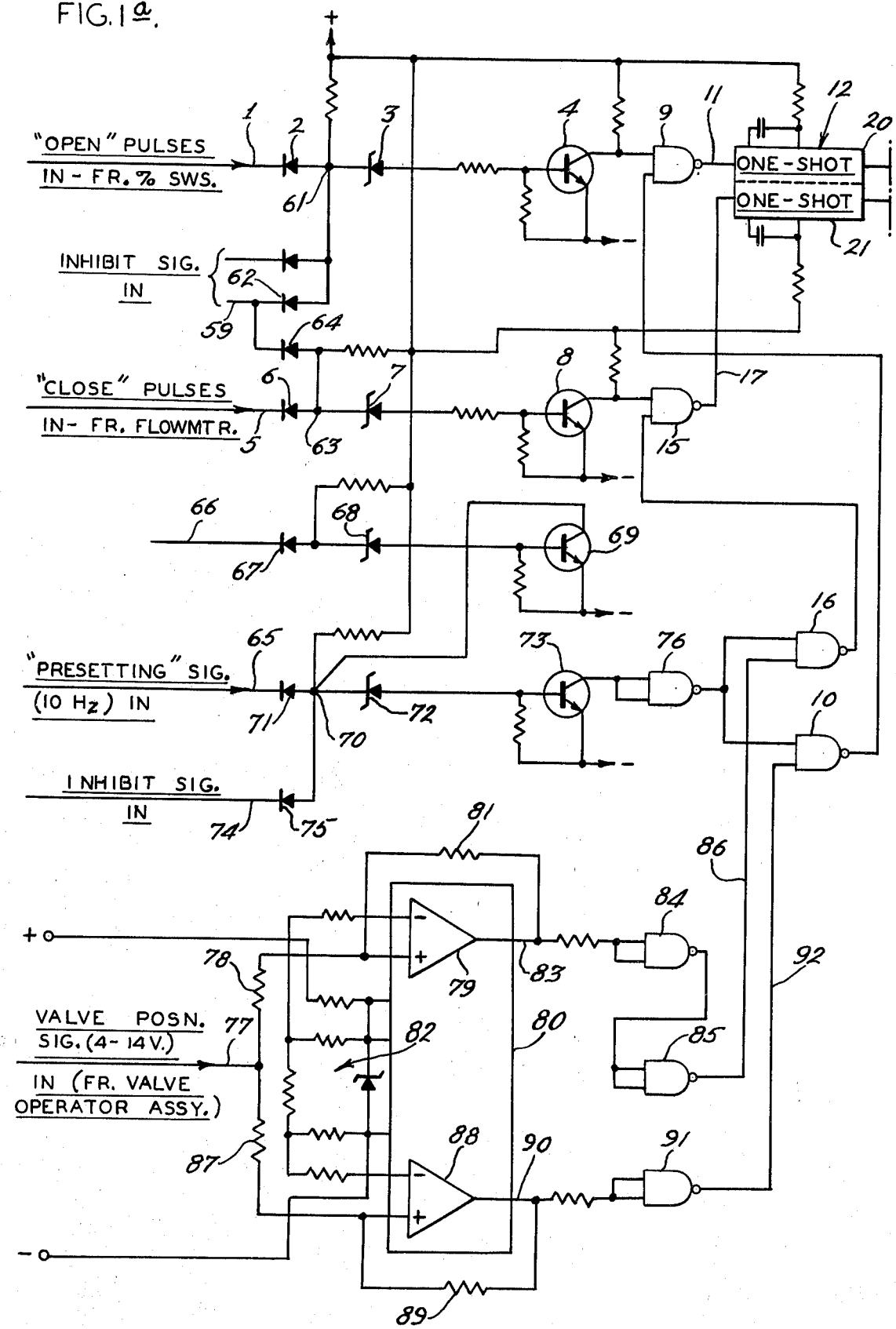
FIG.1ª.

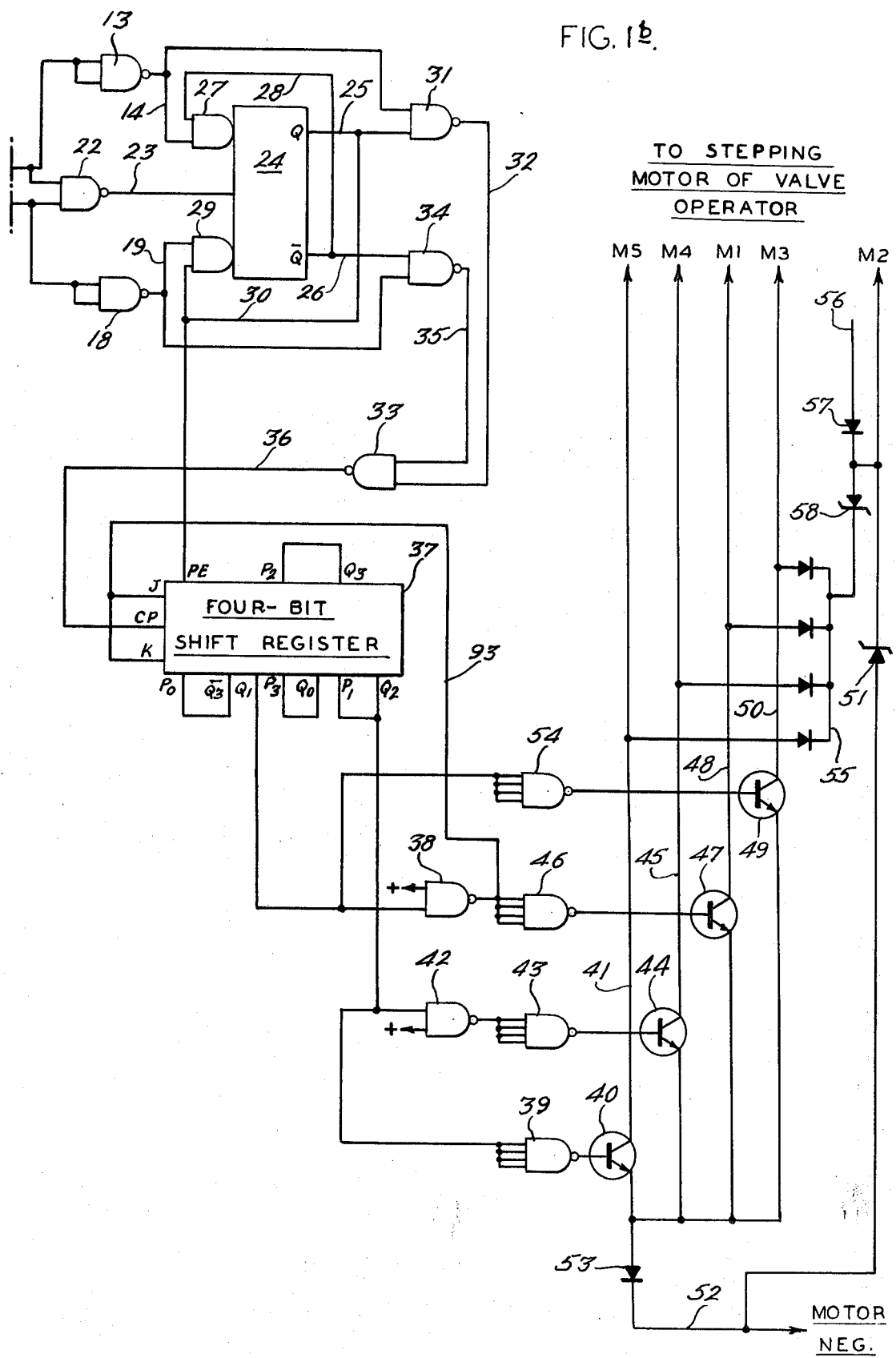
FIG. 1ᵇ.

ANTI-HUNTING SYSTEM FOR VALVE OPERATOR CIRCUIT

This is a division, of application Ser. No. 462,837 filed Apr. 22, 1974 now abandoned.

This invention relates to a valve operator circuit which finds particular utility in a blending system of the type disclosed in my copending application Ser. No. 422,801, filed Dec. 7, 1973, which issued as U.S. Pat. No. 3,860,030 on Jan. 14, 1975, and is a divisional application of my copending application entitled "Valve Operator Circuit with Provision for Presetting", Ser. No. 462,837, filed Apr. 22, 1974, which has now been abandoned.

In a blending system of the aforementioned type, each so-called "stream module" includes a motor drive circuit, for driving a valve operator motor which operates a control valve (throttle valve) in the flow loop corresponding to that particular stream module. Each motor drive circuit compares the pulse rates (repetition rates) of two trains of pulses, one of which may be termed the "demand" pulses and the other of which may be termed the "actual" pulses.

The "demand" pulse train is derived from the output side of a set (three digits) of manually-operable percent switches which function to select, from the output of a pulse generator connected to the input side of these switches and operating at some preestablished frequency, a number of pulses corresponding to the switch settings.

The "actual" pulse train is derived from a so-called stream flowmeter, which is physically located on the downstream side of the control valve previously mentioned and which senses the flow of fluid through such valve; this flowmeter therefore functions to generate pulses at a rate proportional to the "actual" fluid flow through the control valve.

During normal operation, a valve operator motor drive circuit such as described previously operates to compare the pulse rates of the two trains of pulses, and to energize a stepping motor to step the control valve open or closed, depending on which of the two pulse rates is the higher, the energization of the stepping motor continuing until the two pulse rates are the same.

An object of the present invention is to provide a novel motor drive circuit (for a valve operator stepping motor).

Another object is to provide a valve operator motor drive circuit which is constructed and arranged to substantially prevent hunting action.

Figure 3:
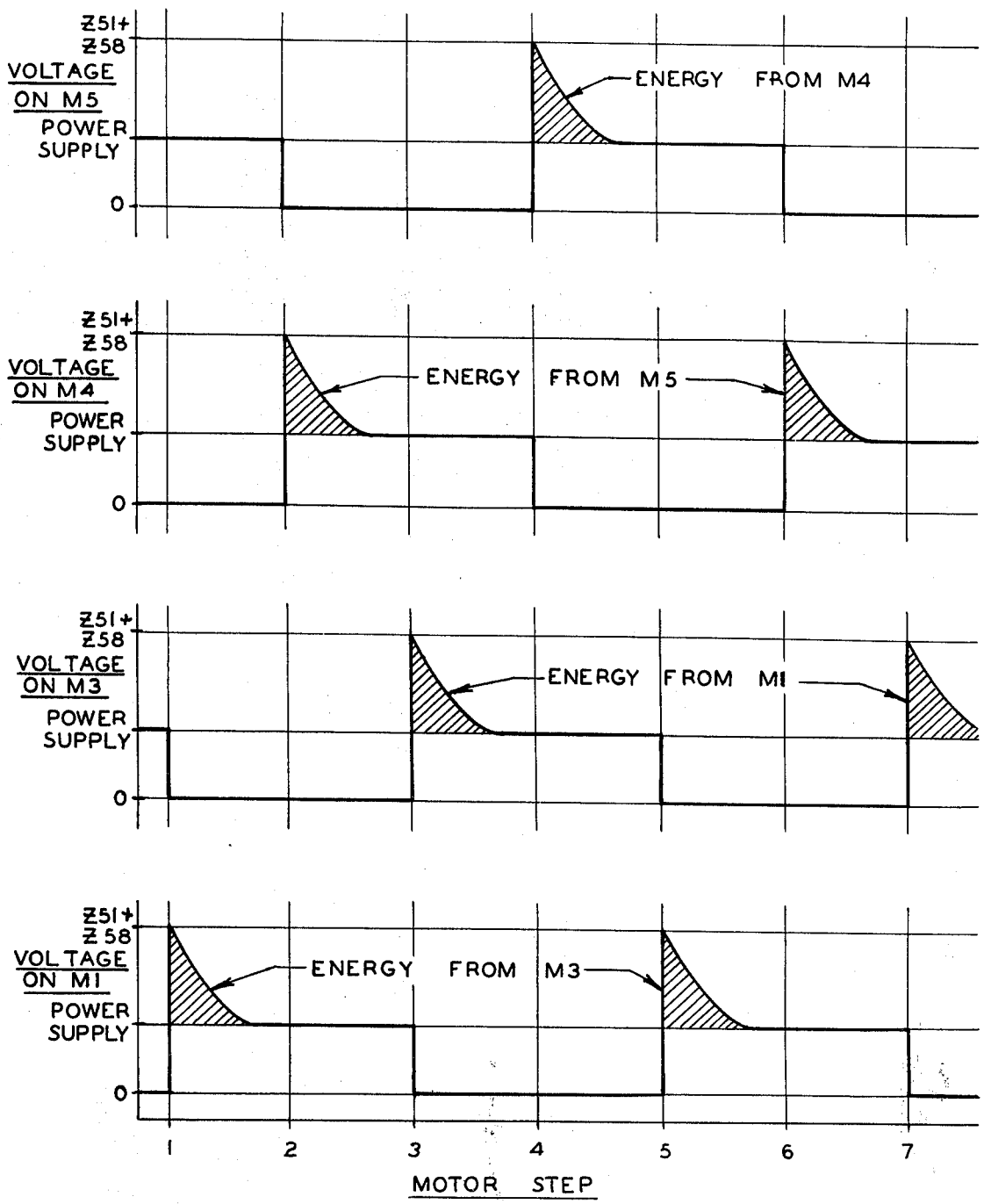

A detailed description of the invention follows, taken in conjunction with the accompanying drawings, wherein:

FIG. 1 (split into two parts, FIG. 1A and FIG. 1b) is a circuit diagram of a valve operator circuit according to this invention; and FIGS. 2 and 3 are sets of waveforms useful in explaining the operation of the invention.

Referring first to FIG. 1, assume that the valve operator motor drive circuit illustrated is used in conjunction with a d.c. stepping motor employed as a valve operator. During normal operation of the motor drive circuit for contrrol of a valve, a train of negative-going "demand" pulses, derived from a pulse generator at some known rate, is applied to the "open" input lead 1 and thence over a diode 2 and a Zener diode 3 to the base of an amplifying transistor 4. Since these pulses can result in energization of the valve operator motor in a sense such as to move the valve toward its open position, they may be termed "open" pulses. Also, during normal operation, a train of "actual" pulses, derived from a flowmeter through which the fluid being controlled is flowing, is applied to the "close" input lead 5 and thence over a diode 6 and a Zener diode 7 to the base of an amplifying transistor 8. Since these last-mentioned pulses can result in energization of the valve operator motor in a sense such as to move the valve toward its closed position, they may be termed "close" pulses.

Amplifier output is taken from the collector of transistor 4 and is utilized as one of the inputs for a NAND gate 9 the other input for which is obtained from the output of a similar gate 10, to be later referred to. Normally, the output of gate 10 is a "1" or "high", so that pulses fed from the output of transistor 4 to gate 9 appear at the output 11 of this latter gate. These last-mentioned pulses are fed into and through one section 20 of a dual one-shot device 12, which functions to shape (shorten) them, and thence to and through a device 13 operating as an inverter, the pulses appearing at the output 14 of this inverter as a series or train of positive-going pulses.

Amplifier output is taken from the collector of transistor 8 and is utilized as one of the inputs for a NAND gate 15 the other input for which is obtained from the output of a similar gate 16, to be later referred to. Normally, the output of gate 16 is a "1" or "high", so that pulses fed from the output of transistor 8 to gate 15 appear at the output 17 of this latter gate. These last-mentioned pulses are fed into and through the other section 21 of the dual one-shot device 12, which functions to shape (shorten) them, and thence to and through a device 18 operating as an inverter, the pulses appearing at the output 19 of this inverter as a series or train of positive-going pulses.

The pulse output of the one-shot section 20 (derived from a pulse generator, as previously mentioned), which comprises a train of negative-going pulses, provides one input to a NAND gate 22 the output of which at 23 provides clock pulses for a flip-flop device 24 (to be later described). The pulse output of the one-shot section 21 (derived from a flowmeter, as previously mentioned), which comprises a train of negative-going pulses, provides the other input for gate 22. In general, the two sets of pulses applied to gate 22 are non-coincident. Since the signals normally on the inputs of gate 22 are both "ones" or "high", and since the pulses at the output of the one-shot sections 20 and 21 are all negative-going, the two sets or trains of pulses are in effect combined by gate 22, and both sets or trains of pulses appear at output 23 in an ordered relation.

Refer now to FIG. 2. The uppermost waveform A represents the train of "close" pulses which are applied to (and which appear on) input lead 5; these pulses are from the flowmeter and are assumed to have a substantially uniform repetition rate. Waveform B represents the signal appearing on lead 19, which may be thought of as the K input for the JK flip-flop device 24. It may be noted that the start of each pulse in waveform B is coincident with the fall of the corresponding pulse in waveform A. Waveform C represents the train of negative-going "open" pulses which are applied to (and which appear on) input lead 1; these pulses are from the percent switches and are assumed to be somewhat irregular, time-wise. Waveform D (presented twice in FIG. 2, for convenience) represents the signal appearing on lead 14, which may be thought of as the J input for flip-flop 24. It may be noted that the start of each pulse in waveform D is coincident with the fall of the corresponding pulse in waveform C.

Waveform E represents the "clock pulse" signal appearing on lead 23. From a comparison of waveform B, D, and E, it may be seen that there is produced a clock pulse E for each of the J pulses D (simultaneously therewith), and also for each of the K pulses B (simultaneously therewith).

Device 24 is an integrated circuit (IC) of the flip-flop type, set up to operate as a so-called JK flip-flop. Waveform G represents the signal appearing on the Q output lead 25 of flip-flop device 24. This flip-flop device is flipped from one state to the other state by a high-to-low transition of the clock pulse, waveform E, if the input signal on the J input, lead 14, waveform D, or the K input, lead 19, waveform B, is a 1 at the same time the other J input, lead 28, or K input, lead 30, is also a 1.

Waveform F represents the signal appearing on the Q-not output lead 26 of flip-flop 24; this waveform is the exact inverse of waveform G.

The inverter output 14 provides one input signal to an AND gate 27 which is in turn coupled to the inpupt of the IC 24; the other input signal for gate 27 is provided by the Q-not signal ouput of the IC 24, by way of a lead 28 connected from output lead 26 to the input side of gate 27.

The inverter output 19 provides one input signal to an AND gate which is in turn coupled to the input of the IC 24; the other input signal for gate 29 is provided by the Q signal output of the IC 24, by way of a lead 30 connected from output lead 25 to the input side of gate 29.

The connections just described, including the gates 27 and 29 comprise an effective arrangement for coupling the J andd K signals (pulse trains) to the inputs of the IC 24.

The J signal (waveform D) at inverter output 14 is fed as one input to a NAND gate 31, the other input to this gate being the signal from the Q output 25. The gate 31 operates in effect to form a resultant dot-product of J (waveform D) and Q (waveform G), this resultant appearing on gate output 32 and being fed to one input of the NAND gate 33.

The K signal (waveform B) at inverter output 19 is fed as one input to a NAND gate 34, the other input to this gate being the signal from the Q-not output 26. The gate 34 operates in effect to form a resultant dot-product of K (waveform B) and Q-not (waveform F), this resultant appearing on gate output 35 and being fed to the other input of the gate 33. The output of gate 33 appears on lead 36.

The arrangement of this invention functions to enable selected J, K data at a leads 14 and 19 (waveforms D and B) to be transferred to "pulse sum" lead 36 as the clock pulses of waveform E go from high to low. As the first clock pulse I illustrated goes from high to low, the Q output (lead 25) is high (see waveform G), and the Q-not output (lead 26) is low (see waveform F), so no signal gets through to lead 36. As the second clock pulse L goes from high to low, the Q output is low (waveform G), and the Q-not output is high (waveform F), so no signal change appears on lead 36 (waveform H). When the next succeeding clock pulse M goes from high to low, the Q output is high (waveform G), and the Q-not output is low (waveform F); again, no signal change appears on lead 36 (waveform H). It may be seen that when the J and K pulses come in alternately and one at a time, no motor energization pulses appear on lead 36 to cause the motor to hunt back and forth; an anti-hunt circuit is thus provided. This prevention of hunting of the motor saves wear on the gears and bearings of the motor drive. (In this condition, it will be realized that clock pulse I results from the first K pulse of waveform B; that clock pulse L results from the first J pulse of waveform D; and that clock pulse M results from the second K pulse of waveform B.)

It is desired to be pointed out at this time that the pulses on lead 36, waveform H, cause the valve motor to step once for each pulse. The direction of the motion, either open or close, is determined by the signal on lead 30, which is connected to lead 25, waveform G.

The two clock pulses M and N each result from A K pulse (to wit, the second and third pulses of waveform B), without the interposition therebetween of a J pulse (on waveform D). When the clock pulse N goes from high to low, the Q output is low (waveform G), and the Q-not output is high (waveform F); under these conditions of signal amplitudes, the gates 31, 33, and 34 act to cause a sum pulse 0 (positive-going) to appear on lead 36 (see waveform H).

It should be noted that the only time a pulse will occur on lead 36, waveform H, is when there is a K pulse on lead 19, waveform B and the Q-not output (lead 26, waveform F) is high, or when there is a J pulse on lead 14, waveform D and the Q output (lead 25, waveform G) is high.

When the next succeeding clock pulse P goes from high to low, the Q output of waveform G is again low, and the Q-not output of waveform F is again high, so no signal change appears on lead 36 (waveform H).

The next two clock pulses R and S result from respective K and J pulses (to wit, clock pulse R results from the fourth K pulse of waveform B, and clock pulse S results from the third J pulse of waveform D), so no pulses appear on the output lead when these clock pulses go from high to low.

The clock pulses S and T each result from a J pulse (to wit, the third and fourth pulses of waveform D), without the interposition therebetween of a K pulse (on waveform B). When the clock pulse T goes from high to low, the Q output is high (waveform G), and the Q-not output is low (waveform F); under these conditions of signal amplitudes, the gates 31, 33, and 34 act to cause a sum pulse U (positive-going) to appear on lead 36 (see waveform H).

The next two pulses V and W each result from a K pulse (to wit, the fifth and sixth pulses of waveform B), without the interposition therebetween of a J pulse (on waveform D). When the clock pulse W goes from high to low, the Q output is low (waveform G), and the Q-not output is high (waveform F); under these conditions of signal amplitudes, the gates 31, 33 and 34 act to cause a sum pulse X (positive-going) to appear on lead 36 (see waveform H).

Summarizing the above action, the anti-hunt circuitry described operates to produce sum pulses on lead 36 only in response to the receipt by the circuit of at least two pulses in succession on the same side (either J or K) before the receipt of one pulse on the other side (either K or J). Thus, the valve operator motor (which is energized in response to these sum pulses) is not energized unnecessarily, in which latter event it would hunt, and be subjected to excessive wear.

The sum phase signals on lead 36 (waveform H) are utilized as the clock pulse input for a four-bit shift register 37. The signal on lead 25, 30 (waveform G, the Q signal output of device 24) is applied as a direction signal to the parallel enable input of the IC (shift register) 37. Device 37 contains four clocked master/slave flip-flops with D inputs. The D input of each stage can be switched between two logical states by the PE input (waveform G). When the PE signal is low (such as during the time between pulses M and P, FIG. 2), the D inputs of the four stages are connected to the parallel inputs ($P_0$, $P_1$, $P_2$, $P_3$). These inputs determine the next condition of the outputs ($Q_0$, $Q_1$, $Q_2$, $Q_3$) synchronous with the clock. When the PE signal is high (such as during the time between pulses S and V, FIG. 2), the D inputs of stages $Q_1$, $Q_2$, and $Q_3$ are the outputs $Q_0$, $Q_1$, and $Q_2$ of the previous stage. The input of $Q_0$ is the J, K input (which is coupled to the output $Q_1$ through an inverter 38 and a connection 93), and the outputs shift one bit for each clock pulse.

The output $Q_2$ of the IC 37 is connected through an inverter 39 to the base of a motor-driving transitor 40 the collector of which is connected to a lead 41 which extends to one of a first pair of terminals which is connected to one phase of a bifilar two-phase stepping motor (not shown), which latter is arranged to drive (rotate) the stem of a valve which is to be operated. The output $Q_2$ is also connected through a double inversion means (comprising two cascaded inverters 42 and 43) to the base of a motor-driving transistor 44 the collector of which is connected to a lead 45 which is connected to the other one of the aforementioned first pair of terminals (for one phase of the valve driving motor).

The output $Q_1$ of the IC 37 is connected through a double inversion means (comprising inverter 38 and an inverter 46 in cascade) to the base of a motor-driving transistor 47 the collector of which is connected to a lead 48 which extends to one of a second pair of terminals for the other phase of the valve driving motor. The output $Q_1$ is also connected through an inverter 54 to the base of a motor-driving transistor 49 the collector of which is connected to a lead 50 which extends to the other one of the aforementioned second pair of terminals (for the other phase of the valve driving motor).

The inverters 39, 43, 26, and 54 are used only to supply additional drive for transistors 40, 44, 47, and 49, and are not necessary for the invention.

the bifilar two-phase stepping motor (not shown) for the valve operator has two windings connected in series for phase I and two windings connected in series for phase II. The common terminal for all four windings is motor terminal M2, which is connected to the positive terminal of the motor power supply through diode 57 and lead 56. Diode 57 protects the power supply if the voltage at M2 exceeds the power supply voltage. Zener diode 51 connected between M2 and the negative terminal of the motor power supply (lead 52) limits the voltage at M2 to slightly above the value of the power supply.

The emitters of transistors 40, 44, 47, and 49 are all coupled to lead 52 through the diode 53. Diode 53 is used to be sure the transistors are turned off when a 0 or low is applied to the base of the transistor.

Lead 41 (previously mentioned) is connected to motor terminal M5 and lead 45 is connected to motor terminal M4; terminals M4 and M5 are located at the respective unconnected or free ends of the windings for phase II. Lead 48 is connected to motor terminal M1 and lead 50 is connected to motor terminal M3; terminals M3 and M1 are located at the respective unconnected or free ends of the windings for phase I.

Diodes are connected from each respective one of the leads 41, 45, 48, and 50 to lead 55, which latter is connected to the common terminal M2 of the stepping motor through a Zener diode 58. These four unnumbered diodes couple the energy which had been stored in an energized motor winding, and which is released when the winding is deenergized, to the winding which is then being simultaneously energized. When a winding is deenergized, the voltage on the respective lead M1, M3, M4, or M5 rises to a value equal to the voltage rating of Zener diode 51 plus the voltage rating of Zener diode 58. This is illustrated in FIG. 3. The last-mentioned voltage (i.e., the value to which the voltage on the respective lead M1, M3, M4, or M5 rises when a winding is deenergized) exceeds the power supply voltage, but is less than the breakdown voltage of the transistors. Thus, when the motor starts to move, there is a voltage which is two to three times normal applied to the winding being energized, and as a consequence the torque developed by the motor is much higher than would normally be developed. Since the energy for this higher torque comes from energized windings, no extra power supply is needed and the energy from the energized windings is not wasted. In this connection, it may be noted that conventionally, this higher torque could be obtained by using a higher voltage power supply, with a dropping resistor to drop the voltage to normal under steady state conditions. However, this requires higher power supply power, and also, power is dissipated in the resistor. Further, the energy from the energized windings is not used.

In order to explain the operation of the IC 37 when connected as a stepping motor logical sequencer, a typical sequence of operations will now be presented by way of example. This sequence will be presented as a series of pulses from the anti-hunting circuit described (appearing on lead 36, as per waveform H), with the PE signal (waveform G, for example) from the same circuit indicating direction.

First pulse, PE high, $Q_0$ high, $Q_1$ and M1 high, M3 low, $Q_2$ and M4 low, M5 high, $Q_3$ low, motor rotation direction forward; second pulse, PE high, $Q_0$ low, $Q_1$ and M1 high, M3 low, $Q_2$ and M4 high, M5 low, $Q_3$ low, motor rotation direction forward; third pulse, PE low, $Q_0$ high, $Q_1$ and M1 high, M3 low, $Q_2$ and M4 low, M5 high, $Q_3$ low, motor rotation direction reverse; fourth pulse, PE high, $Q_0$ low, $Q_1$ and M1 low, M3 low, $Q_2$ and M4 high, M5 low, $Q_3$ low, motor rotation direction forward; fifth pulse, PE high, $Q_0$ low, $Q_1$ and M1 low, M3 high, $Q_2$ and M4 high, M5 low, $Q_3$ high, motor rotation direction forward; sixth pulse, PE low, $Q_0$ low, $Q_1$ and M1 high, M3 low, $Q_2$ and M4 high, M5 low, $Q_3$ low, motor rotation direction reverse; seventh pulse, PE low, $Q_0$ high, $Q_1$ and M1 high, M3 low, $Q_2$ and M4 low, M5 high, $Q_3$ low, motor rotation direction reverse; eighth pulse, PE low, $Q_0$ high, $Q_1$ and M1 low, M3 high, $Q_2$ and M4 low, M5 high, $Q_3$ high, motor rotation direction reverse.

It is pointed out here that in the above operation sequence, the direction of motor rotation for the various pulse steps has been given as either forward or reverse. These are opposite directions of motor rotation, one direction corresponding to opening of the valve being controlled and the other corresponding to the closing of the valve.

Summarizing the normal operation of the valve operator motor drive circuit so far described, pulses are produced (waveform H) when either the open pulse rate (waveform D) or the close pulse rate (waveform B) is higher than the other, and these produced pulses are utilized to step the valve either open or closed (by means of the valve operator stepping motor), depending on which of the two pulse rates is the higher. The valve will continue to be moved (by the valve operator motor) until the two pulse rates are the same (at which time no more sum pulses will be produced on waveform H).

As previously mentioned, when the valve operator circuit of this invention is used in an automatic blending system, the open pulse waveform C is derived from a pulse generator through (manually-settable) percent switches, while the close pulse waveform A is derived from a stream flowmeter.

This invention includes circuitry whereby the valve (which is operated by the valve operator stepping motor, previously described) may be preset or pre-positioned (during the pre-blend period, before actual blending begins) to some selected position, say 25% open. To enable this presetting or pre-positioning of the valve to be done in a proper, accurate, and effective manner, it is necessary to inhibit (i.e., prevent) the normal open pulses C and close pulses A from moving the valve. To effect such inhibiting action, ground is applied to the lead or connection 59 during the pre-blend or valve presetting period. This in effect holds the point 61 (common junction of diodes 2 and 3, in the open pulses input coupling) down near ground potential, via the diode 62; similarly, this in effect holds the point 63 (common junction of diodes 6 and 7, in the close pulses input coupling) down near ground potential, via the diode 64. The holding of the points 61 and 63 near ground potential in this manner blocks or inhibits the open pulses C from reaching the base of transistor 4, and blocks or inhibits the close pulses A from reaching the base of transistor 8.

When the normal open and close pulses have been inhibited in the above-described manner (just prior to the actual valve presetting, and for the purpose of enabling such presetting), the presetting signal, a constant frequency of 10 Hz which is continuously applied to lead 65, is made effective on the circuit by connecting lead 66 to ground. The ground potential on lead 66 is applied over a diode 67 and a Zener diode 68 to the base of an amplifying transistor 69, and the collector of this transistor is connected to a point 70 which is the common junction of a diode 71 and a Zener diode 72.

The special presetting or pre-positioning signal (which during the presetting step may be thought of as taking the place of the open pulses, or of the close pulses, as necessary), which may be a constant frequency signal of 10 Hz, as previously mentioned and as disclosed in the aforementioned copending application, is applied over the diode 71 and the Zener diode 72 to the base of an amplifying transistor 73. When the lead 66 is connected to ground, the potential applied by way of transistor 69 to point 70 is such that the presetting signal (10 Hz) is not blocked off or inhibited from reaching the transistor 73, but when an inhibit signal is applied to the lead 74 and thence over a diode 75 to this same point 70, the presetting signal is inhibited from reaching the transistor 73.

From the collector of transistor 73, the 10-Hz presetting signal goes through an inverter 76 and thence in parallel to one input of the NAND gate 16 and also to one input of the NAND gate 10. As previously described, the output of gate 16 goes to one input of gate 15, and the output of gate 10 goes to one input of gate 9.

The valve operator assembly includes a potentiometer the shaft of which is gear-driven by the same motor (stepping motor) which drives the controlled valve by way of a gearing arrangement. A d.c. voltage is connected across the end terminals of the potentiometer, so the potential on the movable contact (shaft-driven) of the potentiometer is representative of the valve position. The potentiometer signal is transmitted back to the circuit of FIG. 1 to represent valve position (or valve motion), and is applied to the lead 77. By way of example, this signal potential may vary from 4 volts (corresponding to valve closed) to 14 volts (corresponding to valve open); a potential of about 6.5 volts may correspond to valve 25% open.

Lead 77 is connected through a resistor 78 to the direct input of an operational amplifier 79 which is included in the IC 80 and which, by means of positive feedback through a resistor 81, is connected to act like a Schmitt trigger. The arrangement of the amplifier 79, including the resistive network denoted generally by numeral 82, is such that when the valve position potential (at 77) is too low (as compared to that corresponding to the desired valve pre-position), the voltage at the output 83 of this amplifier is a zero or low, while when the valve position potential is substantially in excess of that corresponding to the desired valve pre-position, the voltage at 83 is a one or high.

The voltage at 83 is subjected to a double inversion (effected by means of two inverters 84 and 85 connected in cascade) and then supplied at 86 to one input of the gate 16 (whose other input, as previously described, is supplied by the presetting signal). Thus, the voltage at 86 is 0 or low when the valve position potential is too low (thus preventing any 10-Hz signal from getting through gate 16 and being applied to the close gate 15 under these conditions) and this voltage is 1 or high when the valve position potential is substantially in excess of that corresponding to the desired valve position (thus allowing the 10-Hz signal to appear at the output of gate 16 and to be applied to the close gate 15 under these latter conditions). Hence, the presetting signal (10 Hz) is used as a close signal (for energizing the stepping motor to close the valve) when the valve (as represented by the valve position potential) is open too far.

Lead 77 is connected through a resistor 87 to the direct input of an operational amplifier 88 which is also included in the IC 80 and which, by means of positive feedback through a resistor 89, is connected to act like a Schmitt trigger. The arrangement of the amplifier 88 (including again the resistive network 82) is such that when the valve position potential (at 77) is substantially below that corresponding to the desired valve pre-position, the voltage at the output 90 of this amplifier is a 0 or low; when the valve position potential is very close to that corresponding to the desired valve pre-position, the voltage at 90 is a 1 or high; when the valve position potential is above that corresponding to the desired valve pre-position, the voltage at 90 is a 1 or high.

The voltage at 90 is inverted by an inverter 91 and then supplied at 92 to one input of the gate 10 (whose other input, as previously described, is supplied by the presetting signal). Thus, the voltage at 92 is a 1 or high when the valve position potential is too low (thus allowing the 10-Hz signal to appear at the output of gate 10 and to be applied to the open gate 9 under these conditions), and is 0 or low when the valve position potential is too high (thus preventing any 10-Hz signal from getting through gate 10 and being applied to the open gate 9 under these latter conditions). Hence, the presetting signal (10 Hz) is used as an open signal (for energizing the stepping motor to open the valve) when the valve (as represented by the valve position potential) is closed too far.

When the valve position potential (at 77) is in the immediate vicinity of that corresponding to the desired valve pre-position, the voltage at the amplifier output 83 is 0 or low, and the voltage at the amplifier output 90 is a 1 or high. Therefore, the voltage at 86 is 0 or low, and the voltage at 92 is also 0 or low. Hence, under these conditions the gates 16 and 10 are both closed, so that 10-Hz signal is prevented from getting through either of these gates. The stepping motor is not energized, and the valve is maintained in its proper preset position.

Summarizing the presetting or pre-positioning operation described, when presetting or pre-positioning of the valve is desired, ground is applied to lead 59; this inhibits the normal open and close pulses from moving the valve. Then, with a constant frequency (10 Hz) being continuously applied to lead 65, lead 66 is connected to ground; the valve is then caused to move to a position determined by the IC 80 and its associated circuitry.

The invention claimed is:

1. A pulse rate comparison system for comparing two input pulse trains to control a stepping motor and having means for preventing hunting action, and comprising:
   a. a J-K flip-flop circuit, said J-K flip-flop comprising,
      i. a flip-flop circuit with a set terminal, a reset terminal and a clock terminal as input terminals and Q and $\overline{Q}$ output terminals,
      ii. a first AND gate having one input terminal designated as the J input terminal and a second input terminal connected to the $\overline{Q}$ output terminal, the output of said first AND gate being connected to the set input terminal of the flip-flop circuit, and
      iii. a second AND gate having one input terminal designated as the K input terminal and a second input terminal connected to the Q output terminal, the output of said second AND gate being connected to the reset input terminal of the flip-flop circuit;
   b. means for applying one of two input pulse trains to be compared to the J input terminal of the J-K flip-flop circuit;
   c. means for applying the remaining or second pulse train to the K input terminal of the J-K flip-flop circuit;
   d. means for combining the two input pulse trains to form a third pulse train having an absolute time relationship with the input pulse trains;
   e. means for applying the third pulse train to the clock pulse terminal of the J-K flip-flop circuit; and
   f. means, responsive to the state of the input and output terminals of the J-K flip-flop circuit, for controlling the energizing of the stepping motor so that the motor is moved into the correct position without hunting, whereby a control pulse for energizing the stepping motor is produced only when a pulse is received by either the J or K input terminals of the J-K flip-flop circuit which does not change the state of the output of the J-K flip-flop circuit.

2. The pulse rate comparison system recited in claim 1, wherein the means for combining the two input pulse trains includes a NAND gate.

3. The pulse rate comparison system recited in claim 1, wherein the means for controlling the energizing of the stepping motor comprises:
   a. means for summing the pulse trains from the J and K input terminals and Q and $\overline{Q}$ output terminals to produce a sum output pulse train having a pulse only when a pulse occurs on one of the input terminals of the J-K flip-flop circuit which does not change the state of the output of the J-K flip-flop circuit; and
   b. means, responsive to the sum output pulse train and the state of one of the output terminals of the J-K flip-flop circuit, for energizing the appropriate electrical leads of the stepping motor so that the motor is stepped into its correct position.

4. The pulse rate comparison system recited in claim 3, wherein the summing means comprises:
   a. a first NAND gate having one input terminal receiving the input pulse train applied to the J input terminal and a second input terminal receiving the pulse train experienced at the Q terminal of the J-K flip-flop circuit;
   b. a second NAND gate having one input terminal receiving the input pulse train applied to the K input terminal and a second input terminal receiving the pulse train experienced at the Q terminal of the J-K flip-flop circuit; and
   c. a third NAND gate having one input terminal receiving the output pulse train of the first NAND gate and a second input terminal receiving the output pulse train of the second NAND gate.

5. The pulse rate comparison system recited in claim 3, wherein the means for energizing the stepping motor electrical leads comprises a shift register.

6. The pulse rate comparison system recited in claim 5, wherein the shift register has a clock pulse terminal which receives the sum output pulse train and a parallel enable terminal connected to one of the J-K flip-flop circuit outputs, and means for interconnecting the stages of the shift register and the leads of the stepping motor so that upon receiving pulse trains with predetermined waveforms at the clock pulse terminal and the parallel enable terminal, the leads are energized in a predetermined manner, thereby causing the stepping motor to move a predetermined amount in a predetermined direction.

* * * * *